US008700517B1

(12) United States Patent
Leung et al.

(10) Patent No.: US 8,700,517 B1
(45) Date of Patent: Apr. 15, 2014

(54) APPARATUS AND METHOD FOR COMBINING EASEMENTS UNDER A MASTER LIMITED PARTNERSHIP

(71) Applicant: American Infrastructure Funds, LLC, Foster City, CA (US)

(72) Inventors: Edmond G. Leung, Menlo Park, CA (US); Robert B. Hellman, Jr., Atherton, CA (US)

(73) Assignee: American Infrastructure Funds, LLC, Foster City, CA (US)

( * ) Notice: Subject to any disclaimer, the term of this patent is extended or adjusted under 35 U.S.C. 154(b) by 16 days.

(21) Appl. No.: 13/674,875

(22) Filed: Nov. 12, 2012

(51) Int. Cl.
*G06Q 40/00* (2012.01)

(52) U.S. Cl.
USPC .......................................... 705/36 R; 705/37

(58) Field of Classification Search
USPC ....................................... 705/313, 314, 36 R
See application file for complete search history.

(56) References Cited

U.S. PATENT DOCUMENTS

| | | | |
|---|---|---|---|
| 4,034,735 A | 7/1977 | Waldrip | |
| 5,991,876 A | 11/1999 | Johnson et al. | |
| 6,766,322 B1 | 7/2004 | Bell | |
| 7,734,540 B2 | 6/2010 | Ramsey | |
| 7,797,225 B1 | 9/2010 | Kemp et al. | |
| 7,865,416 B1 | 1/2011 | Graff et al. | |
| 2002/0004757 A1 | 1/2002 | Torres et al. | |
| 2002/0013750 A1 | 1/2002 | Roberts et al. | |
| 2002/0046144 A1 * | 4/2002 | Graff | 705/36 |
| 2002/0099563 A1 | 7/2002 | Adendorff et al. | |
| 2002/0161679 A1 | 10/2002 | Randolph et al. | |
| 2005/0091150 A1 | 4/2005 | Woeber | |
| 2007/0219712 A1 | 9/2007 | Abhyanker | |
| 2008/0046353 A1 | 2/2008 | Poltorak et al. | |
| 2008/0109385 A1 | 5/2008 | Baker | |
| 2009/0018875 A1 | 1/2009 | Monatesti et al. | |
| 2009/0228306 A1 | 9/2009 | Izyayev et al. | |
| 2010/0205085 A1 | 8/2010 | Ramsey | |
| 2011/0004483 A1 | 1/2011 | Ting et al. | |
| 2012/0190386 A1 | 7/2012 | Anderson | |

OTHER PUBLICATIONS

AARP, Public Policy Institute, The Death Care Industry, May 2000, 8 pgs.
Banamraoui, "Islamic Banking: the Case of Algeria", International Journal of Islamic and Middle Eastern Finance and Management, vol. 1, No. 2, 2008, pp. 113-131.
Berry et al., "Master Limited Partnerships: The Hot New Form of Business Organization", NJ, Law and Business, Inc., 1986, p. i-25, 14 pgs.
Canada Newswire, "CI Announces Proposed Merger Details for Limited Partnerships", Ottawa: Apr. 9, 2001, 3 pgs.
Ciccotello et al., "Contracts Between Managers and Investors: A Study of Master Limited Partnership Agreements", Robinson College of Business Administration, Georgia State University, Atlanta, Jun. 1999, 47 pgs.

(Continued)

*Primary Examiner* — Ojo O Oyebisi
(74) *Attorney, Agent, or Firm* — Cooley LLP

(57) ABSTRACT

A computer includes a processor and a memory connected to the processor. The memory stores capital data characterizing capital raised for the purchase of real property easements, operating data characterizing fees collected in connection with the real property easements, and a master limited partnership module with executable instructions executed by the processor to designate master limited partnership income based upon the capital data, the operating data and terms of an easement mater limited partnership.

2 Claims, 2 Drawing Sheets

(56) References Cited

OTHER PUBLICATIONS

Downes et al., "Dictionary of Finance and Investment Terms—5th Edition", Barron's Educational Series, Inc., Hauppauge, NY, 1998, 3 pgs.

Goodgame, "Master Limited Partnership Governance", The Business Lawyer, vol. 60, Feb. 2005, pp. 471-506.

Green Hills Memorial Park, General Price List, Feb. 15, 1995, 3 pgs. [online] [retrieved on Jan. 14, 2008] Retrieved from the Internet: <URL: http://web.archive.org/web/19990219192616/www.greenhillsmemorial.com/merch.html>.

Illinois Landfill Capacity, "Solid Waste Landfill Owners and Operators: Alphabetical by Facility", Nonhazardous Solid Waste Management and Landfill Capacity in Illinois, 1996, 3 pgs.

Karasik et al., "Islamic Finance in a Global Context: Opportunities and Challenges", Chicago Journal of International Law, 7(2): 379-396, Winter 2007, retrieved from http://search.proquest.com/docview/237219993?accountid=14753.

Miller, "The Garbage Behind, The Garbage Ahead", Gotham's Garbage: The Free Market and The Hidden Costs of Turning Trash Into Cash, Oct. 6, 2001, 13 pgs.

New York State, "Cemetery Bulletin", Department of State, Division of Cemeteries, Mar. 2000, No. 4, 2 pgs.

Peltier, "Lawsuit Blames New York Landfills for Health Woes", Waste News, vol. 6, Issue 44, Apr. 22, 2001, p. 49, 2 pgs.

PR Newswire, "AmeriGas Partners $100 Million Senior Notes Affirmed 'BB+' by Fitch IBCA—Fitch IBCA—", New York: Aug. 17, 1998, 3 pgs.

Reilly, "The Language of Real Estate", Chicago, 2000, 2 pgs.

Tariq, "Managing Financial Risks of Sukuk Structures", Sep. 2004, 86 pgs.

Trimble Funeral Homes, Frequently Asked Questions, 5 pgs. [online] [retrieved on Jan. 14, 2008] Retrieved from the Internet <URL: http://web.archive.org/web/20010709015456/http://www.trimblefuneralhomes.com/>.

Twenty-First Century, "Twenty-First Century Partnership Systems Products/Services", 2 pgs., Wayback Machine Internet Archived webpage dated Jul. 16, 2007, <http://web.archive.org/web20070716055932/www.21stcenturycompany.com/partnership_systems.htm>.

US Code, Title 26, , Section 704, 7 pgs.

US Code, Title 26, , Section 7704, 7 pgs.

Puget Sound Regional Council, "Funding for Local Government Infrastructure", Sep. 2009, 76 pgs.

Associated Press, "Investors Target Wests Water Rights/Easterners Hope Value Will Jump", Colorado Springs Gazette-Telegraph, Aug. 16, 1988: B8, 2 pgs.

Beckett, "Utilities/Big Spurt in Water Investments/The Gold Rush of '89 Focuses on Water to Serve Growing West", San Francisco Chronicle, Apr. 10, 1989: C1, 3 pgs.

Colby, "Recent Trends in Southwestern Water Values", The Appraisal Journal, vol. 59, No. 4, ProQuest Central, Oct. 1991, pp. 488-500.

Denmark, "Looming Water Shortages Create Wave of Blue' Investing", Institutional Investor, ProQuest, Sep. 2010, 3 pgs.

Global Water Intelligence, "The Right to Invest in Water", vol. 10, Issue 5, May 2009, 2 pgs.

Michelsen et al., "Expectations in Water-Right Prices", Water Resources Development, vol. 16, No. 2, Jun. 2000, pp. 209-219.

The Wall Street Journal, "Alcan Keeps Terms to Itself of Proposal for Some Arco Assets", New York, NY, Mar. 30, 1984: 1, 2 pgs.

\* cited by examiner

APPARATUS AND METHOD FOR COMBINING EASEMENTS UNDER A MASTER LIMITED PARTNERSHIP

CROSS-REFERENCE TO RELATED APPLICATIONS

This application is related to U.S. Ser. No. 10/306,836, filed Nov. 27, 2002, entitled "Apparatus and Method for Operating a Death-Care Business as a Master Limited Partnership", U.S. Ser. No. 11/558,371, filed Nov. 9, 2006, entitled "Apparatus and Method for Converting Investment Capital into Publicly Traded and Private Master Limited Partnerships", now U.S. Pat. No. 8,041,615, U.S. Ser. No. 12/028,741, filed Feb. 8, 2008, entitled "Apparatus and Method for Operating a Landfill Business as a Master Limited Partnership", U.S. Ser. No. 12/909,320, filed Oct. 21, 2010, entitled "Apparatus and Method for Operating Public Infrastructure as a Master Limited Partnership", U.S. Ser. No. 13/488,335, filed Jun. 4, 2012, entitled "Apparatus and Method for Operating a Cold Storage Facility as a Master Limited Partnership", U.S. Ser. No. 13/168,906, filed Jun. 24, 2011, entitled "Apparatus and Method for Operating a Water Source as a Master Limited Partnership", U.S. Ser. No. 13/243,091, filed Sep. 23, 2011, entitled "Apparatus and Method for Operating a Pool of Single Family Homes as a Master Limited Partnership", and U.S. Ser. No. 13/286,104, filed Oct. 31, 2011, entitled "Apparatus and Method for Utilizing Public Master Limited Partnership Units to form a Sharia-Compliant Bond". The content of each application is incorporated herein by reference.

FIELD OF THE INVENTION

This invention relates generally to computer-implemented control of a business. More particularly, this invention relates to a computer-implemented technique for combining real property easements under a master limited partnership.

BACKGROUND OF THE INVENTION

A master limited partnership (MLP) is a business organization governed by a contract between management (e.g., general partners) and investors (e.g., limited partners). A master limited partnership combines the tax benefits of a limited partnership with the liquidity of publicly traded securities. The master limited partnership was originally conceived as an organizational structure to capitalize on mature, low growth, cash generating businesses. Accordingly, master limited partnerships have been used in such industries as oil, gas, real estate, and natural resources.

Master limited partnerships typically carry dividend yields (e.g., 7-10%). As such, the securities generally trade on a yield basis. Such securities are in high demand due to their superior yield and the lower perceived risk of the stable underlying business.

In a master limited partnership, partners receive cash distributions rather than dividends. Unlike a corporation, qualifying, publicly traded master limited partnerships are not subject to federal and state income taxes. Instead, all income, gains, losses and deductions of a partnership are passed through to the partners who are required to report their allocable share on their individual tax returns. Cash distributions are generally not currently taxable as long as the partner's tax basis in the partnership interest exceeds zero.

The ideal master limited partnership is cash flow positive, but generates minimal taxable income through heavy depreciation, amortization, depletion, and the like. In a partnership, tax losses and gains are passed through to the partners, but when a partnership distributes more cash than it reports as taxable income, the cash distribution amount in excess of the partner's allocable share of income is treated as a return of capital for tax purposes. Thus, under this scenario, each time an investor receives a cash distribution, the return of capital tax treatment lowers his basis in the stock rather than creating dividend income that is taxable as ordinary income in the current period.

In view of these tax advantages, master limited partnerships are predominantly retail products sold to high net worth individuals and other tax paying entities. Most master limited partnerships generate unrelated business taxable income that prevents most institutional investors from being able to invest in master limited partnerships.

The tax advantages of master limited partnerships were greatly reduced through the Tax Reform Act of 1987. In addition, the lines of business in which tax exempt master limited partnerships can operate were greatly limited through the same tax act.

According to the Internal Revenue Code, Section 7704(d), in order for a publicly traded partnership to avoid being taxed as a corporation, it must generate more than 90% of its gross income from qualifying sources, referred to as qualifying income. Master limited partnerships can have wholly-owned taxable subsidiaries to hold the assets that generate non-qualifying income. With this structure, an entity can generate less than 90% of its income from qualifying sources and still qualify as a master limited partnership by dropping the non-qualifying assets into the taxable subsidiary. The primary disadvantage with this structure is that the subsidiary is unable to shield its income from taxes and any dividends that are routed to the master limited partnership are subject to double taxation. The master limited partnership suffers a valuation discount for every dollar of taxes paid by the taxable subsidiary.

In view of the narrowing of the scope of qualifying industries through the Tax Reform Act of 1987 and the inefficiencies outlined above in restructuring businesses that have both qualifying and non-qualifying activities, the use of master limited partnerships outside of the natural resource sector has declined. In addition, despite the Tax Reform Act of 1987 preserving the qualification relating to the sale and/or rental of real property, there have only been several instances of the MLP structure being utilized in a business conducting the sale or rental of real property. Most companies engaged in the ownership, sale and rental of real property have elected to organize under the Real Estate Investment Trust (REIT) structure.

An easement is a right a first party has to use real property of a second party. An easement is considered a property right under common law. The rights of an easement holder vary substantially among jurisdictions.

Many property owners grant easements to generate income. For example, a property owner may grant an easement to a billboard owner, a cell tower owner or a wind turbine owner. In such a scenario, the property owner receives rental income in exchange for the placement of a fixture on the property.

Such an arrangement is tied to a particular piece of land and a particular fixture and therefore lacks diversity. A land owner can enter a contract to grant future rental income for a fixed upfront payment, but such an arrangement has relatively high transactional costs and therefore existing easement arrangements lack liquidity.

In view of the foregoing, it would be desirable to provide improved diversity or liquidity for landowners subject to easements.

SUMMARY OF THE INVENTION

A computer includes a processor and a memory connected to the processor. The memory stores capital data characterizing capital raised for the purchase of real property easements, operating data characterizing fees collected in connection with the real property easements, and a master limited partnership module with executable instructions executed by the processor to designate master limited partnership income based upon the capital data, the operating data and terms of an easement mater limited partnership.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
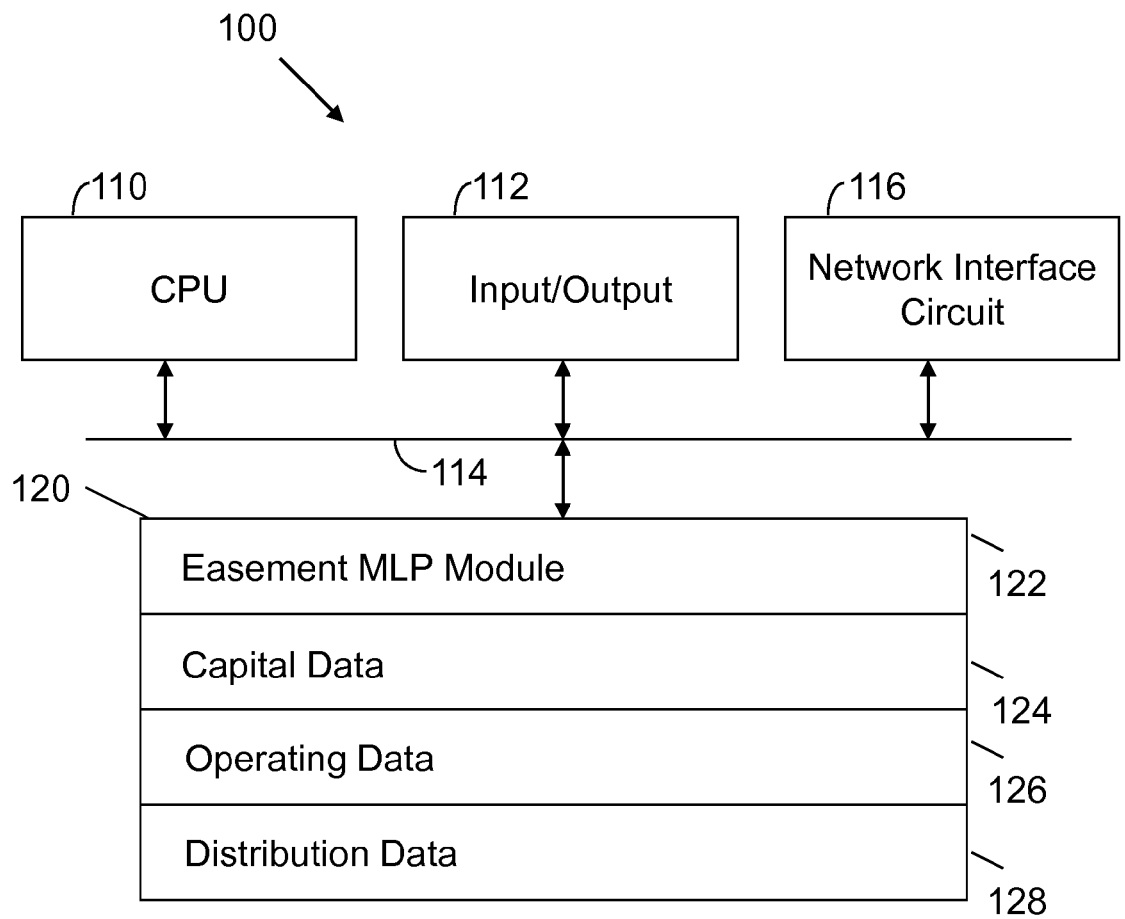
FIG. 1 illustrates a computer configured to implement operations associated with an embodiment of the invention.

FIG. 1 illustrates a computer 100 to implement operations of the invention. The computer 100 includes standard components, such as a central processing unit 110 connected to input/output devices 112 via a bus 114. The input/output devices 112 may include a keyboard, mouse, touchpad, display, printer and the like. A network interface circuit 116 is also connected to the bus 114 and provides access to a network (not shown). Thus, the computer 100 may operate in a networked environment.

A memory 120 is also connected to the bus 114. The memory 120 includes executable instructions to implement operations associated with the invention. The memory 120 stores an easement MLP module 122. The easement MLP module 122 includes executable code defining the terms and conditions of an easement master limited partnership. The easement master limited partnership aggregates real property easement rights and associated rental fees under a master limited partnership structure. The easement master limited partnership also generates income from the sale of real property easement rights. The master limited partnership defines the relationships between the business managers (e.g., the general partners) and the business investors (e.g., the limited partners). The limited partners may include public common unit holders that may exchange units in an open market.

The MLP agreement specifies operating parameters, such as ownership interests, capital structures, investment policies, cash distribution levels, and management rights. By way of example, the executable code of the easement MLP module 122 may include a set of conditional (e.g., if-then-else) statements that control rights and resources in accordance with an underlying master limited partnership agreement. A software engineer using well known programming techniques can prepare the executable code based upon the terms of the master limited partnership agreement.

The easement MLP module 122 accesses capital data 124 characterizing contributed capital from each investor. The easement MLP module 122 also accesses operating data 126. For example, the operating data may specify an easement right, the location of the property subject to the easement, the rental income associated with the easement, the sale income from the disposition of an easement, revenues received, and any termination rights associated with the easement.

The easement MLP module 122 uses the capital data 124, operating data 126 and the terms of the MLP to compute distribution data 128. The distribution data 128 specifies MLP income that is distributed to partners.

The memory 120 may include additional modules, such as a regulatory report module (not shown). The regulatory report module includes executable instructions to process the data in memory and produce regulatory data. The regulatory data may include information on distributed cash. The regulatory data may be submitted to the Securities and Exchange Commission and similar regulatory bodies.

Figure 2:
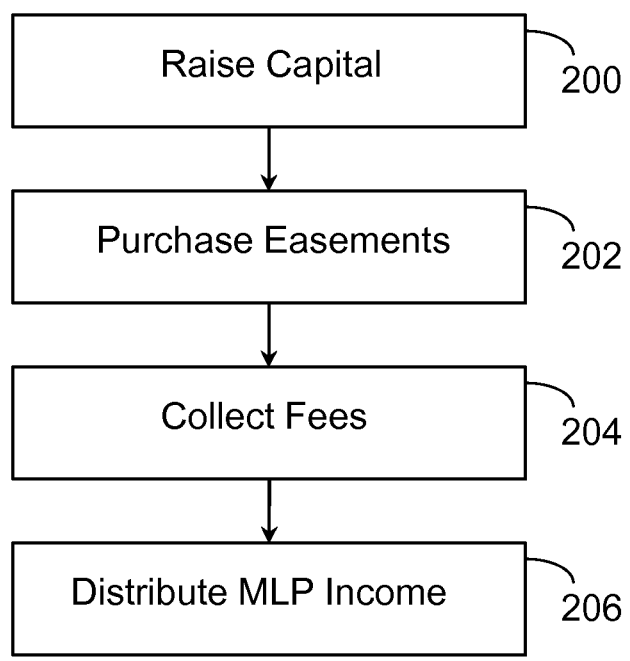
FIG. 2 illustrates operations associated with an embodiment of the invention.

FIG. 2 illustrates processing operations associated with an embodiment of the invention. Initially, capital is raised for an easement MLP 200. The raised capital is entered into computer 100 in the form of capital data characterizing capital contributed by individual investors. Easements are then purchased 202. The easement may be in any number of forms; examples include cell tower easements, billboard easements, municipal infrastructure easements and renewable power easements. The MLP may also purchase a leasehold interest.

Cash may be used to purchase an easement, e.g., an upfront payment in exchange for the rights to ongoing rental income. Alternately, MLP units may be exchanged for the rights to ongoing rental income. In this case, the property owner receives MLP units. Such units are publicly traded and therefore provide to the property owner the ability to control the timing of the liquidity. MLP units also provide the property owner with diversity in the form of an MLP unit that is associated with a combination of easements across geographies, fixture types, industries, and the like.

The property owner assigns the rents and lease rights in exchange for the upfront payment or the receipt of MLP units. The easement may be recorded. Title insurance may also be secured. If a mortgage encumbers the property, one may obtain a subordinated non-disturbance agreement from the lender prior to closing.

The purchased easement may be for a real property right associated with property that currently has a rent generating fixture or will be subject to the construction of a rent generating fixture. Any number of arrangements may be made with a property owner, including an easement buyout (perpetual right), a buyout for a term, a buyout for MLP units and other vehicles.

Fees are then collected. In particular, rental fees associated with an easement are collected. Such rental fees constitute a qualifying fee under an MLP. Fees in the form of gain-on-sale of an easement may also be generated. In this case, the fee is in the form of a profit made from selling an easement at a price higher than its purchase price. Such gain-on-sale fees constitute a qualifying fee under an MLP.

The income data is loaded into computer 100 in the form of operating data 126. MLP income is then distributed 206. In particular, the MLP module 122 processes the capital data, the operating data 126 and the terms of the MLP agreement to designate capital distributions.

Those skilled in the art will recognize a number of advantages associated with the invention. First, the invention provides the property owners with the ability to control the timing of their liquidity. That is, in one embodiment, the invention provides a public partnership unit to a private entity with minimal transaction costs. Next, the invention provides diversity as the property owner exchanges rights to her own easement for rights in a pool of diverse easements. Such advantages are not available through a REIT structure.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

The invention claimed is:

1. A computer, comprising:
   a processor; and
   a memory connected to the processor, the memory storing
      capital data characterizing capital raised for the purchase of real property easements,
      operating data characterizing fees collected in connection with the real property easements, wherein the fees are from aggregated real property easement rights and associated rental fees from rent generating fixtures, and
      a master limited partnership module with executable instructions executed by the processor to designate master limited partnership income based upon the capital data, the operating data and terms of an easement mater limited partnership.

2. The computer of claim 1 wherein the memory further stores information on easement master limited partnership units exchanged for the rights to ongoing rental fees from the rent generating fixtures.

\* \* \* \* \*